(12) United States Patent
Clark (10) Patent No.: US 6,262,551 B1
(45) Date of Patent: *Jul. 17, 2001

(54) MULTI-STEER TESTING APPARATUS

(75) Inventor: David J. Clark, Minneapolis, MN (US)

(73) Assignee: MTS Systems Corporation, Eden Prairie, MN (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/453,318

(22) Filed: Dec. 2, 1999

Related U.S. Application Data
(60) Provisional application No. 60/111,018, filed on Dec. 4, 1998.

(51) Int. Cl.[7] .............................. B64C 13/18; B62D 5/04
(52) U.S. Cl. ....................... 318/587; 318/432; 180/444; 180/445
(58) Field of Search ..................................... 318/432, 434, 318/587; 180/443, 444, 445, 446; 364/424.051

(56) References Cited

U.S. PATENT DOCUMENTS

| | | |
|---|---|---|
| 4,418,780 | 12/1983 | Ito et al. . |
| 4,629,025 * | 12/1986 | Brasier et al. .................... 180/444 |
| 5,033,568 | 7/1991 | Oda et al. . |
| 5,184,298 | 2/1993 | Imaseki et al. . |
| 5,700,951 | 12/1997 | Sagiyama et al. . |

OTHER PUBLICATIONS

International Preliminary Examination Report of PCT Application No. PCT/US99/28474, filed Dec. 02, 1999, dated Jan. 31, 2001.

* cited by examiner

Primary Examiner—Bentsu Ro
(74) Attorney, Agent, or Firm—Westman, Champlin Kelly, P.A.

(57) ABSTRACT

A vehicle test apparatus having a rotationally supported steer member and a steer arm assembly including a steer arm operable coupled to the steer member and movable therewith. The steer arm is coupled to the steer member in a first position to form a forward steer arm connectable to a forward steer unit and orientable in a second position to form a rear steer arm connectable to a rear steer unit for front and rear steer testing. A steer actuator is coupled to the steer member and operable between forward and rear actuation modes for forward and rear steer testing.

23 Claims, 10 Drawing Sheets

| FORCE IN LINK ARM | FORCE IN LEFT TIE ROD | | FORCE IN RIGHT TIE ROD | |
|---|---|---|---|---|
| | FRONT | REAR | FRONT | REAR |
| EXTENSION OF ACTUATOR (COMPRESSION) $F_C$ | $F_T$ COUNTERCLOCKWISE | $F_T$ CLOCKWISE | $F_T$ CLOCKWISE | $F_T$ COUNTERCLOCKWISE |
| RETRACTION OF ACTUATOR (TENSION) $F_t$ | $F_C$ CLOCKWISE | $F_C$ COUNTERCLOCKWISE | $F_C$ COUNTERCLOCKWISE | $F_C$ CLOCKWISE |

MULTI-STEER TESTING APPARATUS

CROSS-REFERENCE TO RELATED APPLICATION

This application claims priority to U.S. Provisional Application Serial No. 60/111,018, filed Dec. 4, 1998, and entitled MULTI-STEER TESTING APPARATUS.

BACKGROUND OF THE INVENTION

The present invention relates to a steering system testing apparatus. In particular, the present invention relates to an adaptable testing system for testing rear and forward steer vehicles.

Testing apparatus are used to analyze durability and performance of steering systems. The test apparatus is designed to simulate actual loads applied during operation of a steering system on the road to collect data for analysis, e.g. durability in service. Steering systems are supported on a platform for testing. Actuators are used to apply loads to the steering system. Load cells are mounted in the load path to a steering system to measure load for analysis. Steering systems include a steering unit, (such as a rack and pinion) and steering linkage for transmitting steer to wheels. Steering linkage includes a steering arm which is coupled to the steering unit and wheels to rotate the wheels about a pivot point. Steering arm linkage is part of the wheel spindle which is what the wheel mounts to and pivots about.

Different vehicles have different steering linkage constructions depending upon the position of the steering unit relative to the front of the vehicle. In particular, in some vehicles, the steer arm is coupled to the wheels forward of the pivot point (e.g. forward steer), and in other vehicles, the steer arm is coupled to the wheels rear of the pivot point (e.g. rear steer). It is desirable to independently test performance of both forward and rear steering systems. This invention addresses this and other problems.

SUMMARY OF THE INVENTION

The present invention relates to a universal test apparatus which is easily adaptable for testing both forward and rear steering units. The vehicle test apparatus includes a rotationally supported steer member and a steer arm assembly including a steer arm operable coupled to the steer member and movable therewith. The steer arm is coupled to the steer member in a first position to form a forward steer arm connectable to a forward steer unit and orientable in a second position to form a rear steer arm connectable to a rear steer unit for front and rear steer testing. A steer actuator is coupled to the steer member and operable between forward and rear actuation modes for forward and rear steer testing.

BRIEF DESCRIPTION OF THE DRAWINGS

FIGS. 7-1 through 7-4 are schematic illustrations for alternate orientations for a steer actuator assembly for simulating steer loads.

DETAILED DESCRIPTION OF THE ILLUSTRATIVE EMBODIMENTS

Figure 1:
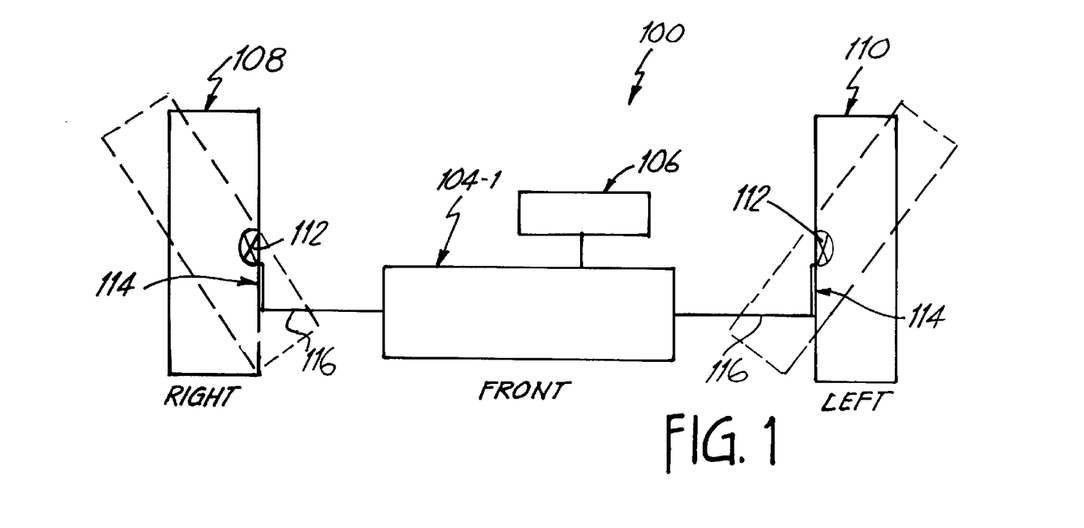
FIG. 1 is a schematic illustration of a forward steer assembly.
Figure 2:
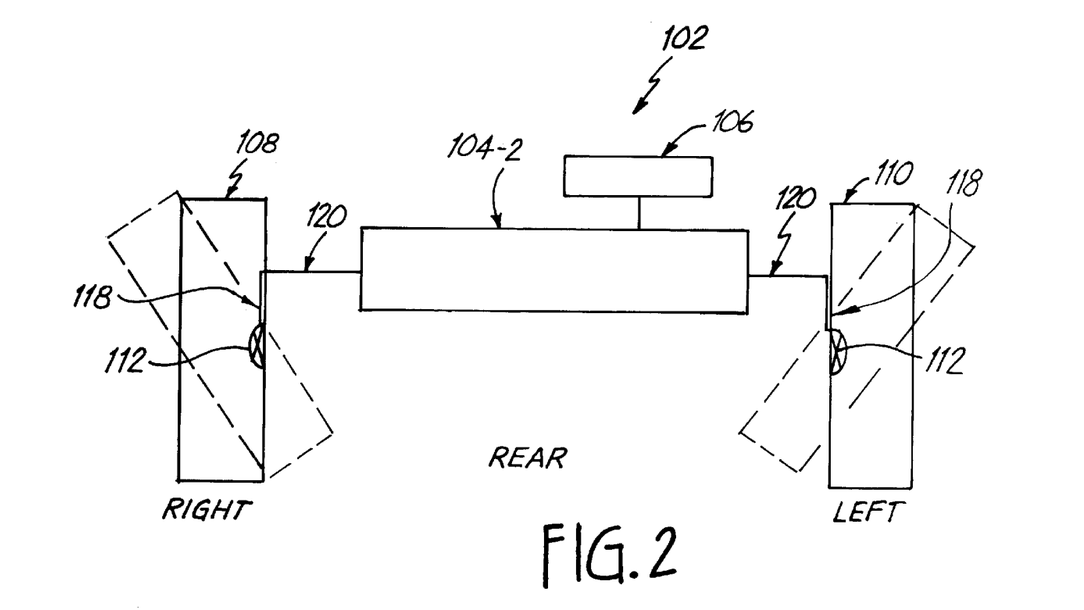
FIG. 2 is a schematic illustration of a rear steer assembly.

The present invention relates to a steering system testing apparatus which is adapted for use with a forward steer system 100 shown in FIG. 1 and a rear steer system 102 shown in FIG. 2. Forward and rear relates to the position of the steering unit relative to a pivot point of the wheel and the front of the vehicle. As shown in FIGS. 1 and 2, the steering systems 100, 102 include a steering unit 104 such as a rack and pinion steering system including a pinion (not shown) operated via a steering wheel 106, shown schematically. Steering linkage is coupled to steering unit 104 for pivoting wheels 108, 110 about pivot point 112 for right and left turns.

As shown in FIG. 1, in steering system 100, steering linkage includes forward steer arms 114 which operably connect a forward steering unit 104-1 to wheels 108, 110 to rotate wheels 108, 110 about pivot 112. Steer arms 114 are connected to steering unit 104-1 via tie rods 116, illustrated diagrammatically. In the rear steering system 102, rearward steer arms 118 operably connect a rear steering unit 104-2 to wheels 108, 110 to rotate wheels 108, 110 about pivot 112. Steer arms 118 are connected to steering unit 104-2 via tie rods 120 illustrated schematically.

Figure 3:
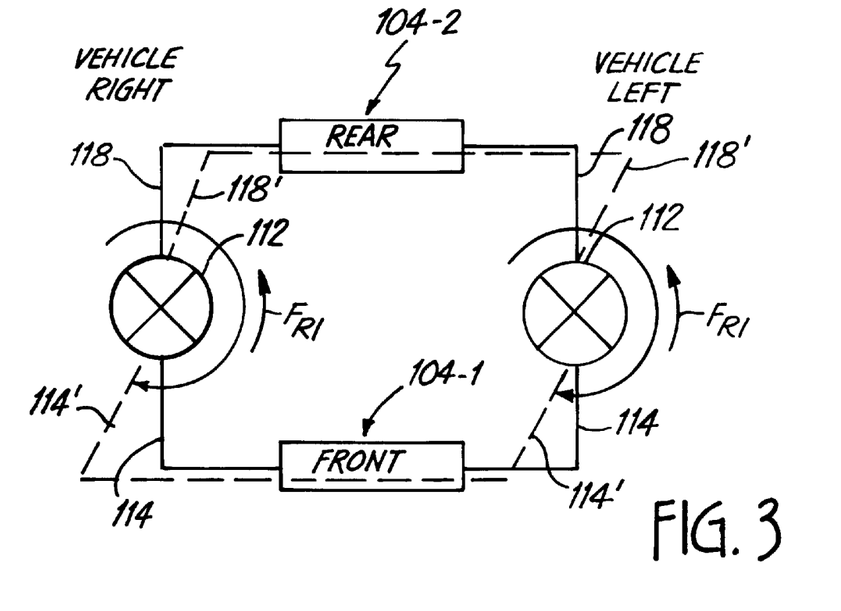
FIG. 3 is a schematic illustration of a simulated right turn (clockwise rotation) for front and rear steer.
Figure 4:
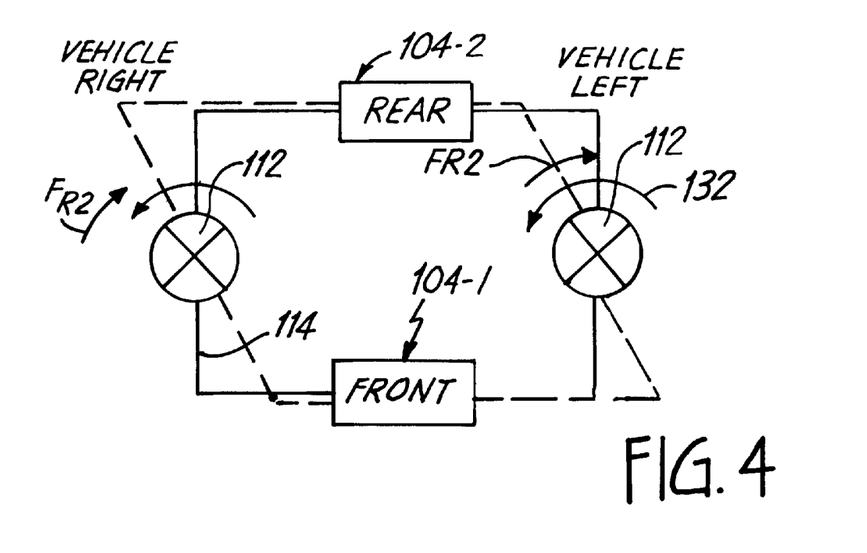
FIG. 4 is a schematic illustration of a simulated left turn (counterclockwise rotation) for front and rear steer.

FIGS. 3–4 schematically illustrate operation of forward and rear steering systems 100, 102 or units 104-1, 104-2. FIG. 3 illustrates actuation of the forward and rear steer arms 114, 118 for clockwise rotation about pivot 112 to simulate a right turn (as illustrated by the dashed lines). FIG. 4 illustrates actuation of the forward and rear steer arms 114, 118 for counterclockwise rotation to simulate a left turn. Clockwise rotation of wheel about pivot 112 is opposed by reactive force $F_{R1}$, and counterclockwise rotation about pivot 112 is opposed by reactive force $F_{R2}$. During operation, reactive forces for a right hand turn FRI are imparted to the steering units 104-1, 104-2 as follow:

TABLE 1

| Right Hand Turn - Clockwise Rotation | | |
|---|---|---|
| | VEHICLE RIGHT | VEHICLE LEFT |
| FRONT STEER 104-1 | RIGHT COMPRESSION $F_{RC}$ | LEFT TENSION $F_{LT}$ |
| REAR STEER 104-2 | RIGHT TENSION $F_{RT}$ | LEFT COMPRESSION $F_{LC}$ |

Counterclockwise rotation of wheel about pivot 112 is opposed by reactive force $F_{R2}$. During operation, for a left hand turn the reactive force $F_{R2}$ is imparted to steering units 104-1, 104-2 as follows:

TABLE 2

Left Hand Turn - Counterclockwise Rotation

|  | VEHICLE RIGHT | VEHICLE LEFT |
|---|---|---|
| FRONT STEER 104-1 | RIGHT TENSION $F_{RT}$ | LEFT COMPRESSION $F_{LC}$ |
| REAR STEER 104-2 | RIGHT COMPRESSION $F_{RC}$ | LEFT TENSION $F_{LT}$ |

Testing apparatus simulate operating conditions by applying steering loads through steer arms to steering units 104 to evaluate performance. For test operation, it is desirable to supply compression and tension loads to the steering units 104-1, 104-2 to simulate actual steering loads as illustrated in Tables 1 and 2 above. As illustrated in Tables 1–2, forward and rear steer have opposite steering load dynamics.

Figure 5:
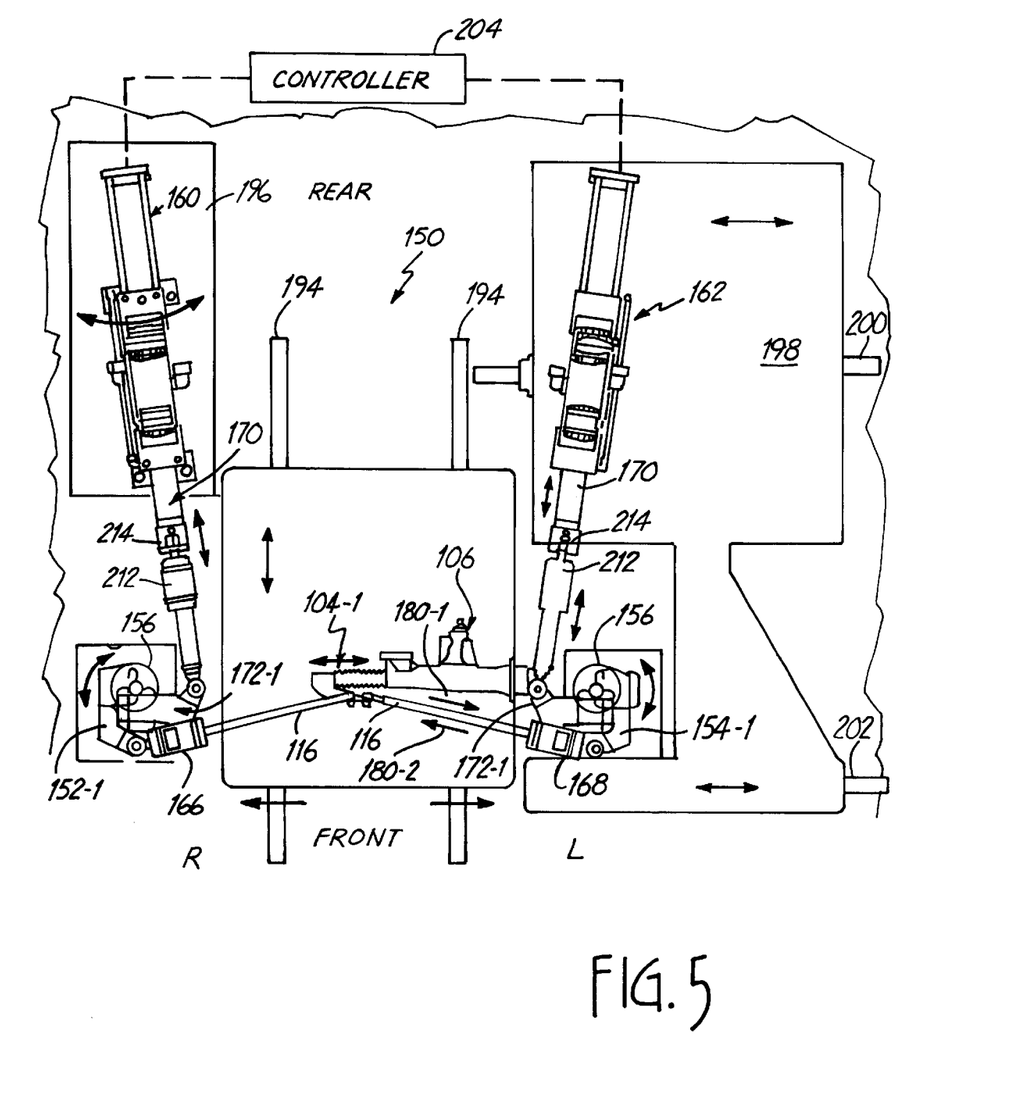
FIG. 5 is a plan view of an embodiment of a test apparatus of the present invention in a front steer mode.
Figure 6:
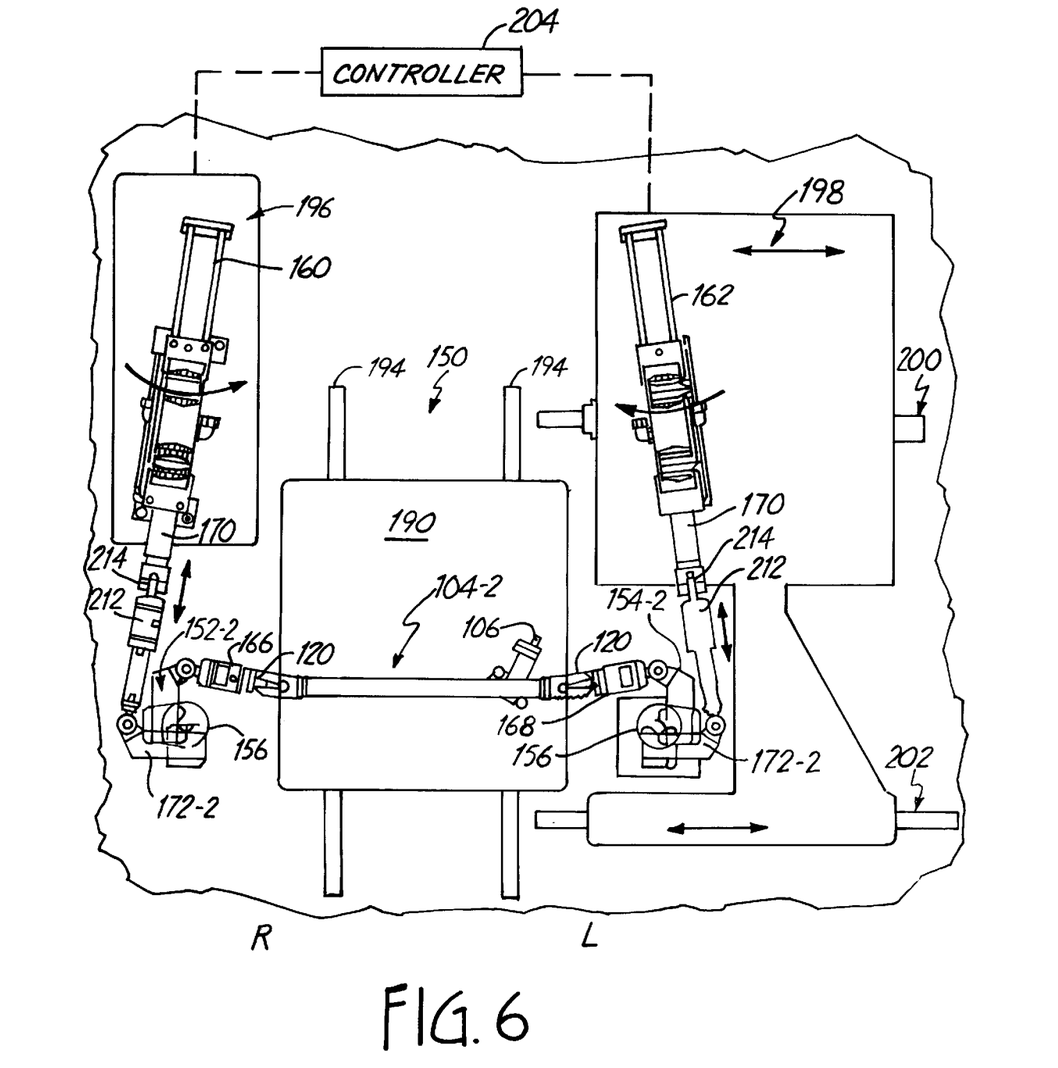
FIG. 6 is a plan view of an embodiment of a test apparatus of the present invention in a rear steer mode.

The testing apparatus of the present invention is adaptable for testing both forward and rear steering units 104-1, 104-2 to supply compression and tension loads to simulate reactive steering loads imparted to a steering unit during operation. FIGS. 5–6 illustrate an embodiment of a test apparatus 150 including a forward and rear steer test mode for testing forward and rear steering systems. FIG. 5 illustrates a forward steer test mode and FIG. 6 illustrates a rear test mode. As shown in FIGS. 5–6, apparatus includes right and left steer arms 152, 154 coupled to steer members 156 which simulate steer arms 114, 118 and pivot 112 of a vehicle steering system.

For operation a steering unit 104-1 or 104-2 is coupled to right and left steer arms 152, 154. For forward steer shown in FIG. 5, steer arms 152-1, 154-1 extend forward from steer members 156 and connect to tie rods 116 connected to a forward steering unit 104-1, and for rear steer, steer arms 152-2, 154-2 extend rearward from steer members 156 to connect to rear steering unit 104-2 via tie rods 120 for simulating operating loads to forward and rear steering units 104-1, 104-2. Steer arms 152, 154 can be removably coupled to steer members 156 for selective connection in a forward or rear orientation for forward or rear steer test modes.

As shown in FIGS. 5–6 to simulate reactive steer loads $F_{RC}$, $F_{LT}$ and $F_{RT}$, $F_{LC}$ illustrated in Tables 1–2, steer members 156 rotate to supply steer load through steer arms 152, 154. For a $F_{RC}$, $F_{LT}$ steer load, steer members 156 are rotated counterclockwise for front steer and clockwise for rear steer. For a $F_{RT}$, $F_{LC}$ steer load, steer members 156 are rotated clockwise for front steer and counterclockwise for rear steer as summarized in the Table 3 below.

TABLE 3

|  | $F_{RC}/F_{LT}$ | $F_{RT}/F_{LC}$ |
|---|---|---|
| FRONT STEER 104-1 | COUNTERCLOCKWISE | CLOCKWISE |
| REAR STEER 104-2 | CLOCKWISE | COUNTERCLOCKWISE |

Steer loads are supplied to steering units 104-1, 104-2 through steer members 156 by steer actuators 160, 162. Steer actuators can pneumatic, hydraulic or electromechanical. Steer actuators 160, 162 are coupled to steer members 156 to rotate steer members 156 in a clockwise rotation and a counterclockwise rotation to simulate operating loads. Load cells 166, 168 are interposed in the load path to the steering units 104-1, 104-2 to measure steer loads.

Steer actuators 160, 162 include movable or extendable steer actuator arms 170 which are connected to steer members 156 via actuator lever arm 172 to rotate steer members 156. Actuator arms 170 are extended or retracted to rotate steer members 156 for testing operations. Orientation of the actuators 160, 162 and actuator levers 172 affects the direction of rotation of the steer members 156. FIG. 7-1, FIG. 7-2, FIG. 7-3 and FIG. 7-4 illustrate alternate orientations (inward or outward) of actuators 160, 162 and actuator levers 172 for clockwise and counterclockwise rotation of the steer members 156.

In FIGS. 7-1 and 7-4 actuator arm 170 is extended to rotate steer member 156 clockwise as illustrated by the solid arrow and actuator arm 170 retracts to rotate steer member 156 counterclockwise as illustrated by the dashed line and in FIGS. 7-2 and 7-3 actuator arm 170 is extended to rotate steer member 156 counterclockwise as illustrated by the solid arrow and actuator arm 170 retracts to rotate steer member 156 clockwise as illustrated by the dashed line.

As previously explained, to supply a $F_{RC}$ and $F_{LT}$ test load to steering units, steer members 156 are rotated counterclockwise for front steer and are rotated clockwise for rear steer, and to supply a $F_{RT}$, $F_{LC}$ steer load to steering units, steer members 156 are rotated clockwise for front steer and counterclockwise for rear steer. Depending upon orientation of actuators 160, 162, extension or retraction of actuator arm 170 rotates steer members 156 in a clockwise or counterclockwise direction as illustrated in FIGS. 7-1 through 7-4. In the embodiment of the present invention, actuators 160, 162 operate between a forward steer mode and rear steer mode so that similar actuation of actuator arm 170 (e.g. extension or retraction) provides similar test loads $F_{RT}/F_{LC}$, or $F_{RC}/F_{LT}$ for forward and rear steer.

Figure 8:
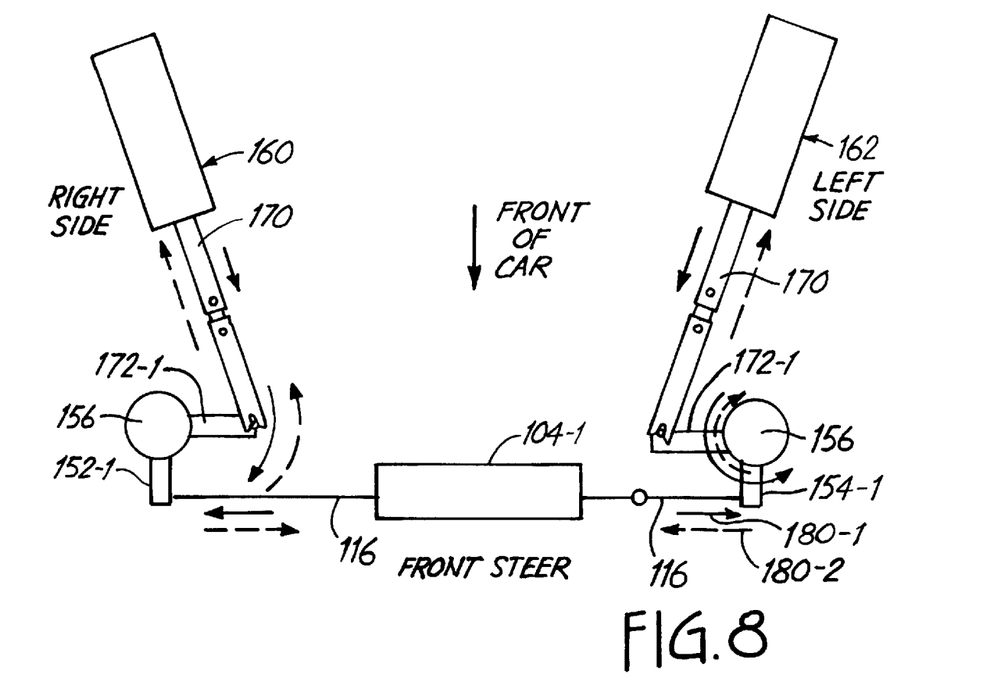
FIG. 8 is a schematic illustration of operation of an embodiment of the test apparatus in front steer mode.
Figure 9:
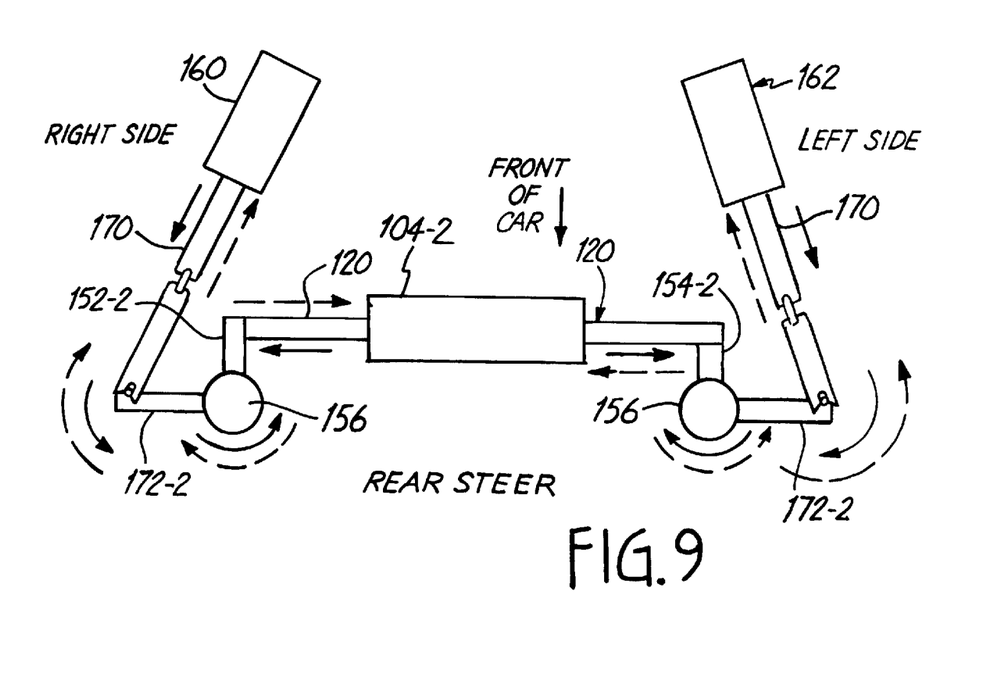
FIG. 9 is a schematic illustration of operation of an embodiment of the test apparatus in rear steer mode.

In the specific embodiments shown in FIGS. 5–6, actuators 160, 162 are pivotally supported to operate between an inward orientation towards a steering unit 104 and an outward orientation relative to a steering unit 104. Lever arms 172-1 shown in FIG. 5 provides an inward moment arm and lever 172-2 in FIG. 6 provides an outward moment arm. Actuator arms 170 couple to inward and outward lever arms 172 so that extension and retraction of actuator arms 170 rotates steer members to supply similar test loads to forward and rear steer units 104-1, 104-2 as illustrated schematically in FIGS. 8–9. In FIGS. 8–9, dotted lines illustrate reaction of retraction of actuator arm and solid lines illustrate extension of actuator arm.

For example, for forward steer, shown in FIGS. 5 and 8, actuators 160, 162 face inwardly and connect to inward lever arms 172-1. Vehicle left actuator 162 rotates lever arm 172-1 counterclockwise to simulate an outward or tension force FLT as illustrated by arrow 180-1 to tie rod 116 and steering unit 104-1 and clockwise to simulate an inward or compression force $F_{LC}$ to tie rod 116 and steering unit 104-1 as illustrated by arrow 180-2. Actuation of steering loads $F_{RC}$–$F_{LT}$ and $F_{RT}$–$F_{LC}$ for forward testing operations as summarized in Table 4 below.

TABLE 4

Forward steer

| FORCE APPLIED | RIGHT - LEFT ACTUATOR ROD 160, 162 | ROTATION MEMBER |
|---|---|---|
| $F_{RC}$ – $F_{LT}$ | RETRACTED/EXTENDED | COUNTERCLOCKWISE |
| $F_{RT}$ – $F_{LC}$ | EXTENDED/RETRACTED | CLOCKWISE |

As illustrated, actuator 160 is retracted and actuator 162 is extended to rotate steer members 156 counterclockwise for supplying a $F_{RC}$, $F_{LT}$ load to steering units 104-1, 104-2 and actuator 160 is extended and actuator 162 is retracted to rotate steer members 156 clockwise to supply $F_{RT}$, $F_{LC}$ load to steering units 104. Load cells 166, 168 are interposed in the load path to the steering units 104-1, 104-2 to measure load during testing operation.

For rear steer as shown in FIGS. 6 and 9, actuators 160, 162 pivot so that actuators 160, 162 face outwardly and lever arms 172-2 are connected to face outwardly to adapt the testing apparatus for rear steer testing. Steer arms 152, 154 are detached and reoriented in a rearward direction to simulate rear steer arms 118. As shown in Table 3, rear steer has opposite clockwise-counterclockwise operating parameters for steer members 156 to supply similar $F_{RC}/F_{LT}$ and $F_{RT}/F_{LC}$ loads to steering unit 104-2. As illustrated in Table 5, actuators 160, 162 are orientated so that extension and retraction of actuator arms 170 provides opposed rotation direction for rear steer to apply similar test loads. In particular, as shown, retraction of actuator 160 and extension of actuator 162 supplies a $F_{RC}$, $F_{LT}$ load in both front and rear steer modes. Similarly, extension of actuator 160 and retraction of actuator 162 supply a $F_{RT}$, $F_{LC}$ load to steering units 104-1, 104-2 in both front and rear steer.

TABLE 5

Rear Steer

| FORCE APPLIED | RIGHT, LEFT ACTUATORS, 160, 162 | ROTATION MEMBER |
|---|---|---|
| $F_{RC} - F_{LT}$ | RETRACTED/ EXTENDED | CLOCKWISE |
| $F_{RT} - F_{LC}$ | EXTENDED/ RETRACTED | COUNTERCLOCKWISE |

In the embodiment shown in FIGS. 5–6, a specimen or steering unit 104 is supported on table 190 for testing. Table 190 is movably supported relative to a base along track 194. The position of table 190 is adjusted for forward and rear steer modes to align specimen 104 with steer arms 152, 154 orientated for forward or rear steer. In the embodiment shown, steer actuators 160, 162 are pivotally supported relative to platforms 196, 198 to pivot or move between a forward steer mode position and a rear steer mode position.

Steer members 156 are rotationally supported relative to actuators 160, 162 and steer arms 152, 154. Platform 198 is movable along tracks 200, 202 to adjust the distance between left and right steer members 156 depending upon wheel base dimensions. A controller 204 is coupled to actuators 160, 162 to supply desired test loads for operation. Although particular orientations for the actuators are shown, application of the present invention is not limited to the particular orientations shown, and different orientations may be adopted consistent with the invention. Although the test apparatus shown includes a right and left steer member, application is not limited to an apparatus including both right and left steer members.

Figure 10:
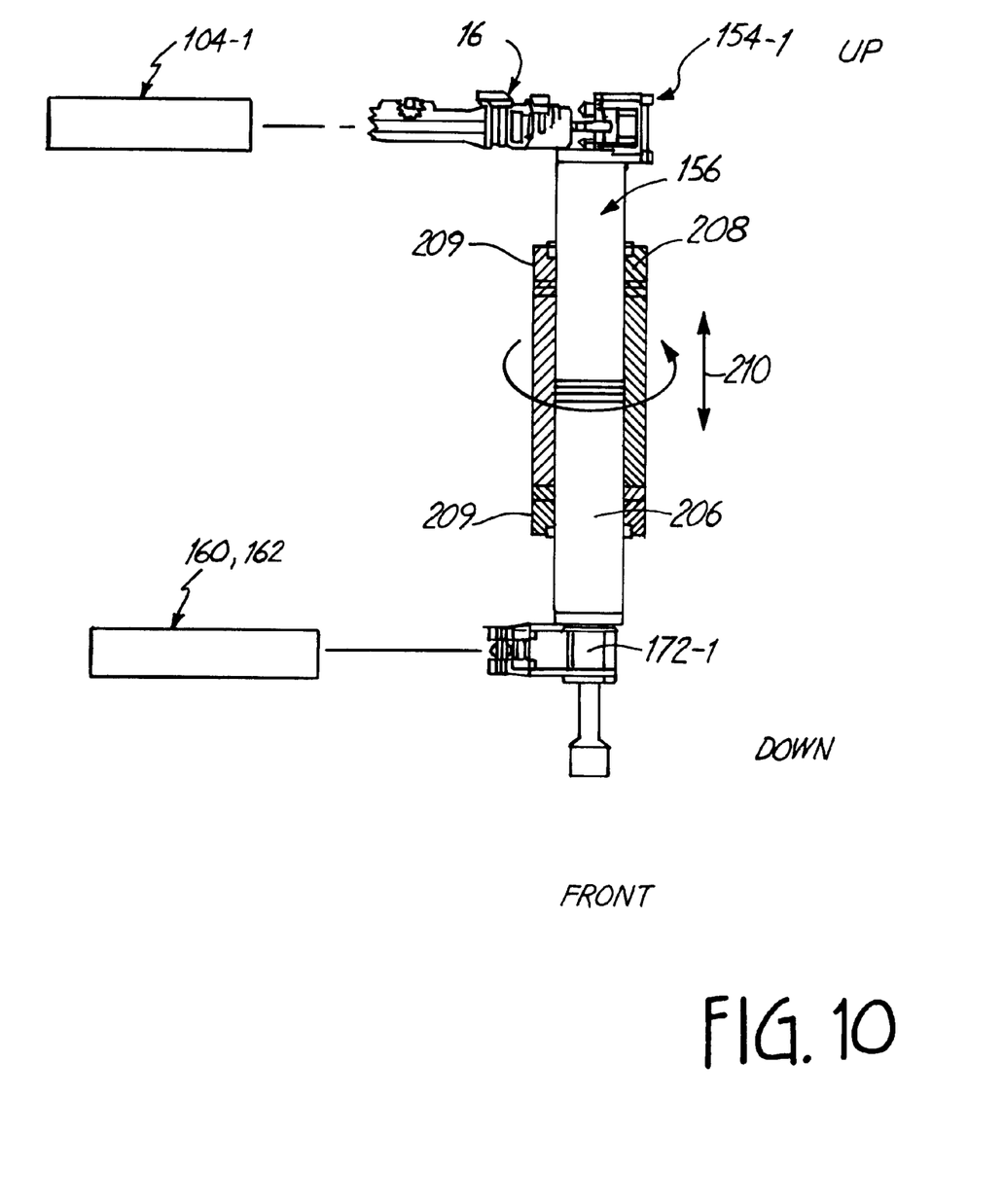
FIG. 10 is an elevational view of a vertical actuator for simulating test loads for front steer.
Figure 11:
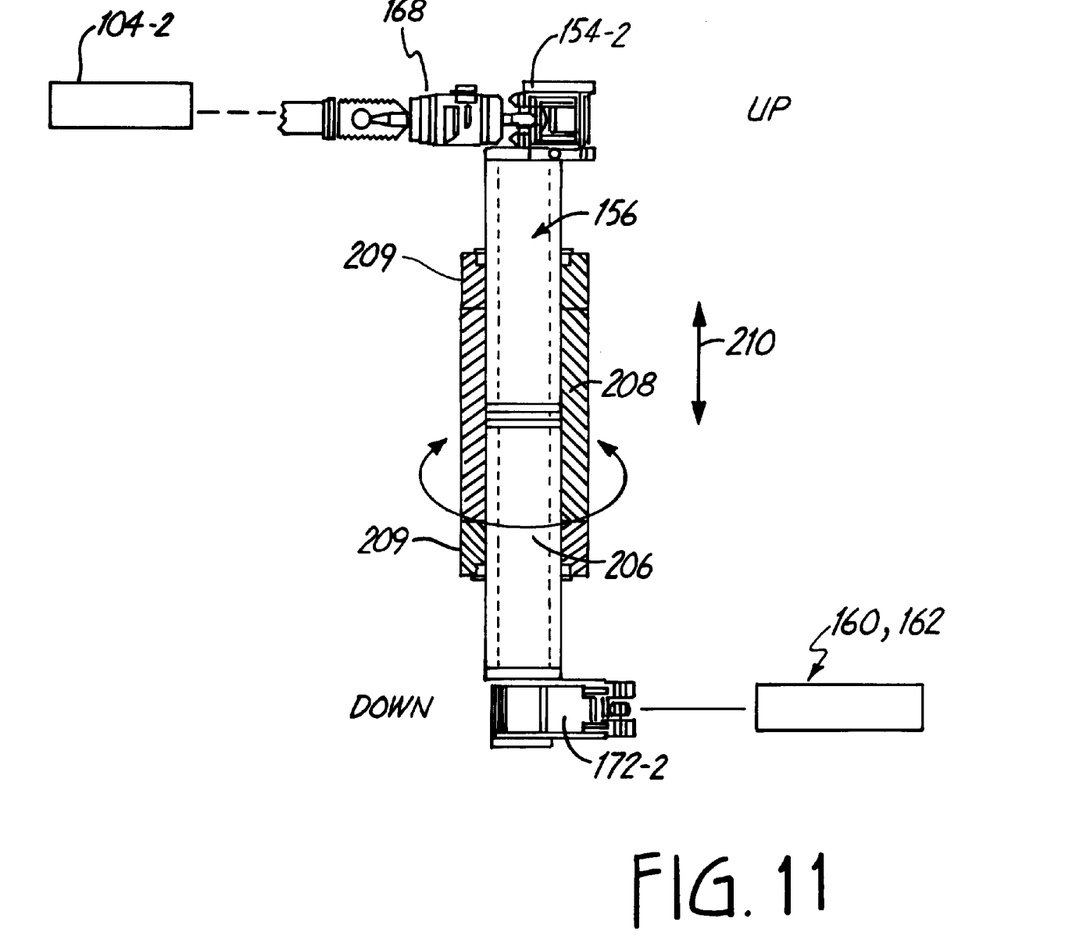
FIG. 11 is an elevational view of a vertical actuator for simulating test loads for rear steer.

As illustrated in FIGS. 10–11, in an embodiment of the test apparatus 150 right and left steer members 156 include a vertical actuator to simulate a bumpy road. Vertical actuators include a vertical actuator rod 206 rotationally supported in a vertical actuator body 208. Vertical actuator rod 206 is rotationally sealed in fluid chamber of vertical actuator body 208 by hydrostatic end caps 209 to form steer member for transmitting steering torque. Actuator rod 206 moves vertically to raise and lower tie rod 116 or rod 120 relative to a steering unit as illustrated to simulate movement of wheels 104, 106 over a bumpy road or a pot hole. Fluid pressure is supplied to fluid chamber to raise and lower actuator rod 206, as illustrated by arrow 210, through accumulator valve assembly 211 shown in FIGS. 13–14.

As shown in FIGS. 5–6, actuator arms 170 of actuators 160, 162 are connected to lever arms 172 via link arms 212 which are pivotally coupled at connection 214 to arms 170 to compensate for elevational differences of steer members 156 relative to actuators 160, 162. The position of steer arm 154 is such that vertical movement of steer member 156 or rod 206 causes arms 152, 154 to rotate since the rod 116, 120 pivots at steering unit 104 to compensate for the elevation difference of the steer member as illustrated in Table 6 below.

TABLE 6

| | LEFT | RIGHT |
|---|---|---|
| FORWARD | CLOCKWISE | COUNTERCLOCKWISE |
| REAR | COUNTERCLOCKWISE | CLOCKWISE |

Vertical movement also rotates arm 172 since link 212 pivots at connection 214. Actuators 160, 162 and lever arms 172 are oriented so that rotation steer member 156 in a single direction adjusts for vertical movement of actuator rod 206 without imparting load to the actuator rod 206. This arrangement limits movement actuator 162 needs to maintain no load on the vertical actuator. In particular, as illustrated in Table 6, front and rear steer have opposite operating dynamics for vertical movement of the member 156. Movement of the member 156 rotates arms 152 in opposite directions in forward and rear steer.

Thus, for vertical actuation, actuators 160, 162 are independently orientated between a forward actuation position and a rear actuation position and lever arms 172 are orientated in opposed directions so that a single rotation direction counterclockwise or clockwise adjusts the position of steer arms 152, 154, and lever arms 172 to maintain no load on the actuator.

For example, for the left side, forward steer, vertical actuation rotates steer arm 154 and lever arm 172 clockwise to compensate for the elevation difference, with no load and in rear steer vertical actuation rotates steer arm 154 and lever arm 172 counterclockwise to compensate for the elevation difference with no load. Although the Figures illustrate a particular no load arrangement for vertical actuation, application is not limited to the particular embodiment and other arrangements or designs can be implemented.

Figure 12:
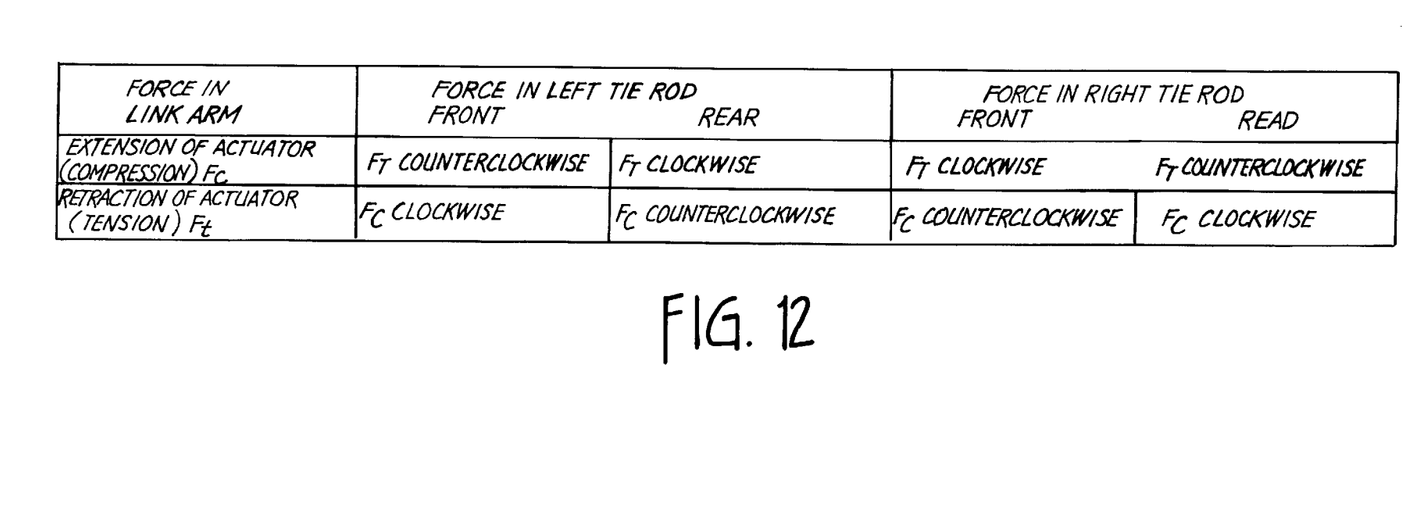
FIG. 12 is a chart illustrating operation for a balanced load for vertical actuation.
Figure 13:
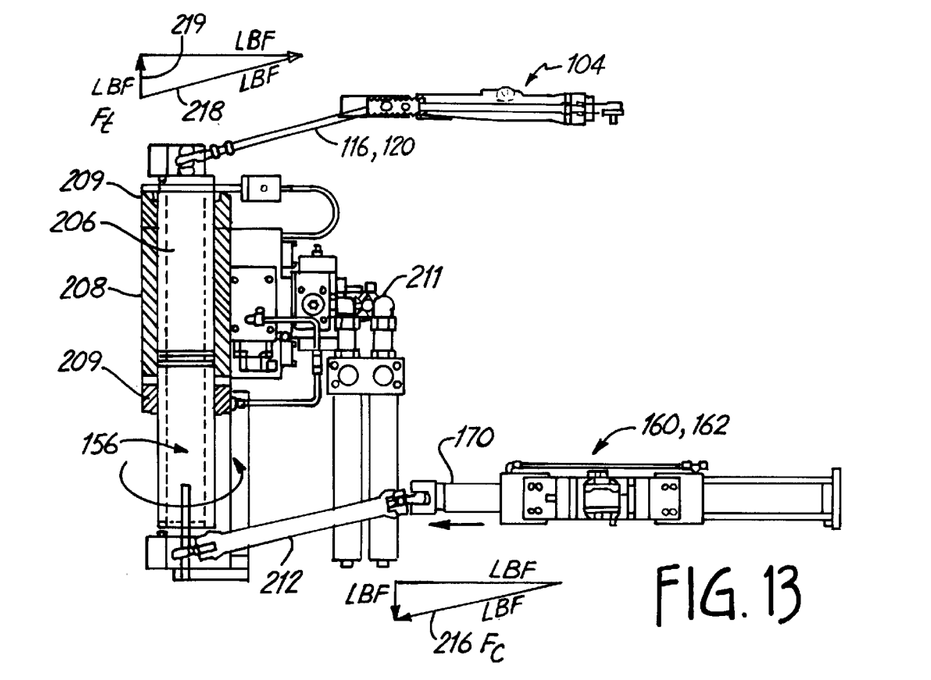
FIG. 13 illustrates balanced forces on a vertical actuator.

To operate vertical actuators 206, sufficient force must be supplied to overcome forces supplied to actuator rod 206 (or steer member) through link arm 212 and tie rods 116 and 120. As shown in FIGS. 12–13, extension of arm 170 supplies a compression force $F_c$ having a vertical component through link arms 212 and to actuator (steer member 156) as illustrated by arrow 216. Retraction of arm 170 supplies a tension force $F_t$ having a vertical component through link arms 212 to actuator (steer member 156).

To limit the influence of forces for operating the vertical actuator, testing components are arranged so that the rotation direction of steer member provides opposed forces (i.e. tension—compression or compression-tension) to link 212 and tie rods 116, 220 so that additive forces do not need to be overcome to vertically move actuators 206 for operation, as illustrated in FIG. 12.

As illustrated in FIG. 12, to balance forces, actuators 160, 162 are arranged so that extension of link arm 212 supplies $F_c$ 216 through link arm 212 to actuator lever 172 and rod 206 and rotates steer member to impart a $F_T$ 218 force in tie rod and actuator rod 206 and retraction of link arm supplies $F_T$ and rotates steer arm to impart a $F_c$ force in tie rod 116, steer arms and actuator rod 206 to balance force loads on opposed ends of the vertical actuator rod 206. Since operating dynamics are opposite, actuators are movable between first and second actuator modes so that extension of actuator 160, 162 rotates steer member 156 to provide an opposed tension force in tie rods, steer arms and actuator rod 206 to provide a balanced load.

FIG. 13 illustrates opposed forces supplied to link arm 212 and tie rods 116, 120. Link arms 212 shown face out of the page and the specimen is rotated 90 degrees for clarity. Vertical actuator is shown lowered. As shown in FIG. 12, actuators 160, 162 are oriented so that arm 170 is extended to rotate steer member (or actuator rod 206) to supply tension force in tie rod 116, 120 and steer arm. Extension of arm 170 imparts a downward compression force $F_c$ in link 212 to lever arm 172 along line 216 including a vertical component pointing down and rotates steer member 156 (clockwise or counterclockwise depending upon whether forward or rear steer) to supply a tension load $F_T$ in tie rods 116, 120 and steer arm as illustrated by line 218 when actuator is lowered to provide an opposed load.

Figure 14:
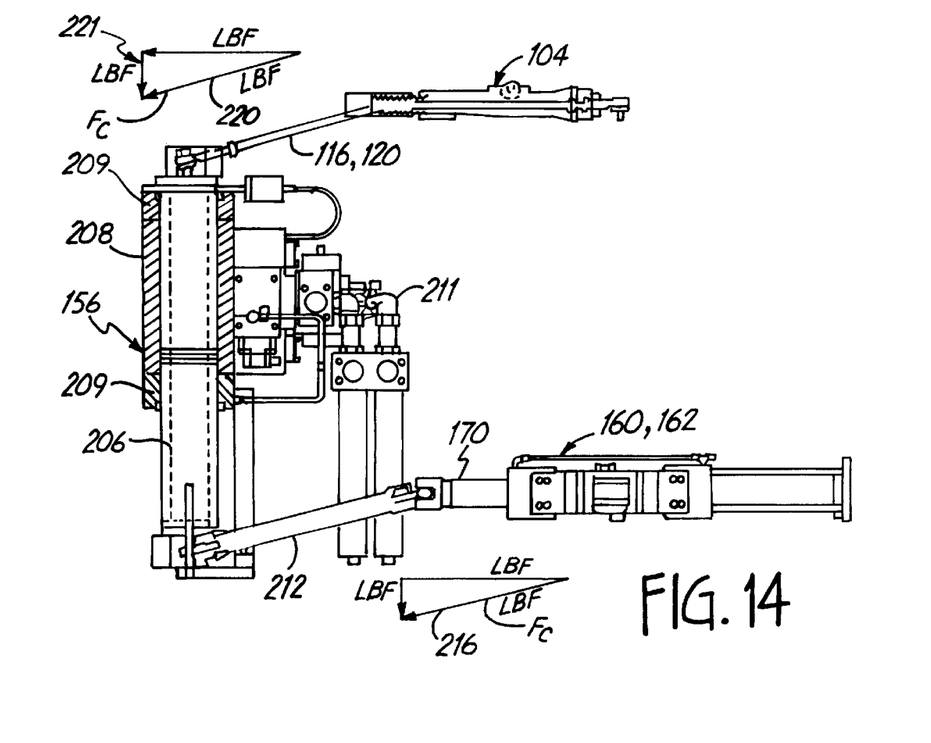
FIG. 14 illustrates additive forces on a vertical actuator.
Figure 71:
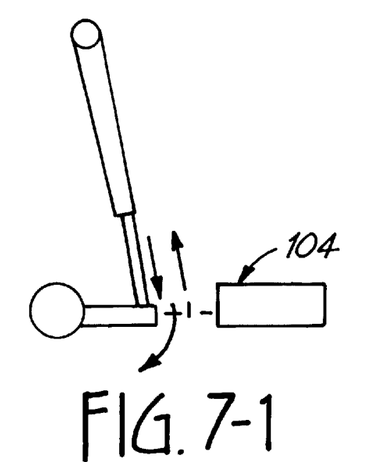
Figure 72:
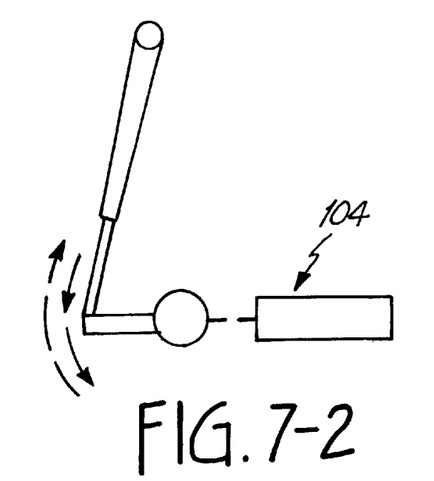
Figure 73:
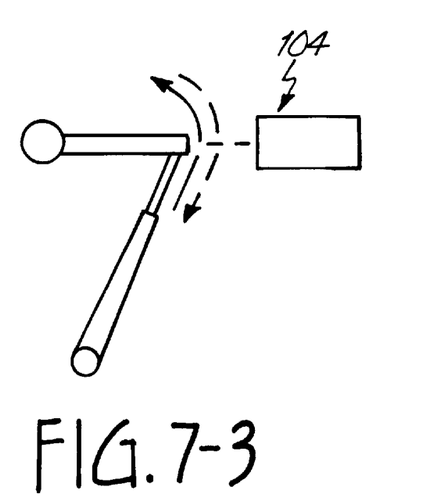
Figure 74:
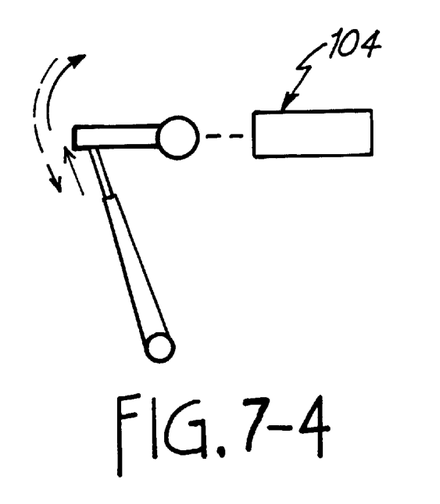

In contrast, as illustrated in FIG. 14, actuators are oriented so that extension of arm 170 imparts an downward compression force $F_c$ in link 212 to lever arm 172 and actuator rod 206 and rotate steer member 156 to impart a compression load in tie rod 116, 120 (and to steer arm and actuator rod 206) which supplies an additive force to actuator which must be overcome to operate vertical actuators for testing operation.

In particular, in FIG. 14, actuators 206 are shown in a lowered position so that extension of arm 170 provides a downward compression force 216 in link 212 and lever arm 172 and rotation creates a downward compression force 220 in tie rods 116, 120 and steer arm to supply an additive force load. Thus, for forward steer, actuators 160, 162 are oriented in a first inward direction relative to the steering unit 104 and lever arms 172 are oriented in a first direction, as illustrated in FIG. 5, so that extension of arm 170 rotates steer members 156 to provide a tension load in tie rods 116, 120, steer arm and actuator rod 206 and retraction of arm 170 rotates steer member 156 to provide a compression load in tie rods 116, 120, steer arm and actuator rod 206 for balanced loads and for rear steer actuators 160, 162 face outwardly (relative to steering unit 104) and lever arms 172 are oriented in a first direction so that extension of arm 170 rotates steer member 156 to supply a tension force in tie rods 116, 120, steer arm and actuator rod 206 and retraction of arm 170 rotates steer member to supply a compression load in tie rods 116, 120, steer arm and actuator rod 206. Although FIGS. 5–6 illustrate a particular arrangement for opposed load application to the steering member, application is not limited to the particular embodiment shown.

Although the present invention has been described with reference to preferred embodiments, workers skilled in the art will recognize that changes may be made in form and detail without departing from the spirit and scope of the invention.

What is claimed is:

1. A vehicle test apparatus comprising:
    a base;
    a steer member rotationally supported relative to the base;
    a steer arm assembly including a steer arm operably coupled to the steer member and movable therewith, the steer arm coupled to the steer member in a first position to form a forward steer arm connectable to a forward steer unit and orientable in a second position to form a rear steer arm connectable to a rear steer unit for front and rear steer testing; and
    a steer actuator coupled to the steer member and operable between forward and rear actuation modes and operable between first and second actuation positions, in the first actuation position, the steer actuator rotating the steer member to supply a compression load to the forward steer unit in a forward actuation mode and the rear steer unit in a rear actuation mode and in the second actuation position, the steer actuator rotating the steer member to supply a tension load to the forward steer unit in the forward actuation mode and the rear steer unit in the rear actuation mode.

2. The vehicle test apparatus of claim 1 wherein the steer actuator is pivotally coupled to the base to pivot between the forward and rear actuation modes.

3. The test apparatus of claim 1 wherein the steer actuator includes an actuator lever which is removably connectable to the steer member for orientation in first and second opposed positions for the forward and rear actuation modes.

4. The vehicle test apparatus of claim 1 including a controller coupled to the steer actuator and configured to operate the steer actuator to supply a compressive load in the first actuation position in the forward and rear actuation modes and a tension load in the second actuation position in the forward and rear actuation modes.

5. The vehicle test apparatus of claim 1 wherein the steer actuator includes an actuator arm movable between an extended position and a retracted position, and operably coupled to the steer member so that retraction of the actuator arm rotates the steer member to supply a compression load in the forward and rear steer modes and extension of the actuator arm rotates the steer arm to supply a tension load in the forward and rear steer modes.

6. The test apparatus of claim 1 wherein the steer arm is detachably coupled to the steer member for orientation in the first and second positions for front and rear steer testing.

7. The vehicle test apparatus of claim 1 including a vertical actuator coupled to the steer member to simulate an operating environment.

8. The vehicle test apparatus of claim 7 wherein the steer actuator is operably coupled to steer member to rotate the steer member through a lever arm operably connecting the steer actuator to the steer member and the lever arm orientated in a first direction for forward steer and a second opposed direction for rear steer so that rotation of the steer member in a single direction rotates the steer arm and the lever arm to maintain no load on the vertical actuator for vertical actuation in the forward and rear steer modes.

9. The vehicle test apparatus of claim 7 wherein the steer actuator is coupled to the steer member by a lever arm orientable in a first direction for forward steer and a second direction for rear steer so that actuation of the steer actuator supplies a first load to the lever arm to rotate the steer member to supply a second opposed load in the steer arm to balance load for vertical actuation.

10. The test apparatus of claim 7 wherein the vertical actuator includes a vertical actuator rod rotationally supported relative to an actuator body to form the steer member and movable for vertical actuation and the steer actuator includes an actuator arm coupled to the vertical actuator rod and movable between an extended position and a retracted position so that retraction of the actuator arm supplies a tension load to the vertical actuator rod and rotates the actuator rod to supply a compression load and extension of the actuator arm supplies a compression load to the vertical actuator rod and rotates the vertical actuator rod to supply a tension load.

11. The vehicle test apparatus of claim 1 including a table movably supported along a track to operate between a forward steer position and a rear steer position, in the forward steer position, the table being positioned to support a forward steer test unit and in the rear steer position, the table being positioned to support a rear steer test unit.

12. The vehicle test apparatus of claim 1 including opposed left and right steer members and opposed steer arms coupled to the left and right steer members.

13. A vehicle test apparatus comprising:

a base;

steer members rotationally supported relative to the base for transmitting steering torque;

steer arms operably coupled to the steer members and movable therewith, the steer arms coupled to the steer members in a first position to form forward steer arms connectable to a forward steer unit and orientable in a second position to form rear steer arms connectable to a rear steer unit for front and rear testing; and steer actuators operably coupled to the steer members through an actuator lever and operable between a forward steer mode and a rear steer mode, in the forward steer mode, the actuator lever being orientated in a first direction and in the rear steer mode, the actuator lever being orientated in a second opposed direction.

14. The vehicle test apparatus of claim 13 wherein the steer actuators are pivotally connected to the base to pivot between a front steer position and a rear steer position.

15. The vehicle test apparatus of claim 13 including vertical actuators coupled to the steer members to simulate an operating environment.

16. The vehicle test apparatus of claim 13 wherein the first and second directions of the actuator lever are orientated so that actuation of the steer actuators supplies a first load to the actuator lever to rotate the steer members to supply a second opposed load to the steer arms in the opposite direction of the first load to provide a balance load.

17. The vehicle test apparatus of claim 15 wherein the vertical actuators include a vertical actuator rod rotationally supported relative to an actuator body to form the steer members and movable for vertical actuation and the steer actuators include an actuator arm coupled to the actuator rod and movable between an extended position and a retracted position so that retraction of the actuator arm supplies a tension load to the actuator rod and rotates the actuator rod to supply a compression load and extension of the actuator arm supplies a compression load to the actuator rod and rotates the actuator rod to supply a tension load.

18. The vehicle test apparatus of claim 15 wherein the actuator lever is orientated so that rotation of the steer members in a single direction rotates the steer arms and the actuator levers to maintain no load on the vertical actuators for vertical actuation.

19. A test method comprising the steps of:

connecting one of a forward or rear steer unit to a steer actuator;

supplying a steering load to the forward or rear steer unit for measuring steering loads;

disconnecting the forward or rear steer unit;

connecting the other of the forward or rear steer unit to the steer actuator; and supplying a steering load to the other of the second forward or rear steer unit.

20. The method of claim 19 including the step of:

adjusting the steer actuator between a forward steer mode and a rear steer mode.

21. The method of claim 19 wherein the steer actuator is operably coupled to a steer member to supply a steering load through an actuator lever and including the step of:

adjusting the orientation of the actuator lever from a first orientation to a second orientation for operation in the forward and rear steer modes.

22. The method of claim 19 wherein the steer actuator includes an extendable arm operable between a retracted position and an extended position; and extending the actuator arm to supply a tension load to the steer unit and retracting the actuator arm to supply a compressive load to a steer unit in a forward steer mode and a rear steer mode.

23. A vehicle test apparatus comprising:

a base;

a steer member rotationally supported relative to the base for transmitting steering torque;

steer arm operably coupled to the steer member and movable therewith, the steer arm coupled to the steer member in a first position to form a forward steer arm connectable to a forward steer unit and orientable in a second position to form a rear steer arm connectable to a rear steer unit for front and rear testing;

a vertical actuator coupled to the steer member; and a steer actuator means operable coupled to the steer member to supply a steering load to steer the member to simulate an operating load to a steering unit for forward and rear steer with a balanced actuating load for vertical actuation.

* * * * *